United States Patent [19]

Kawamura

[11] Patent Number: 5,044,790
[45] Date of Patent: Sep. 3, 1991

[54] PRINTING APPARATUS

[75] Inventor: Yoshiaki Kawamura, Narashino, Japan

[73] Assignee: Canon Kabushiki Kaisha, Tokyo, Japan

[21] Appl. No.: 430,057

[22] Filed: Oct. 31, 1989

Related U.S. Application Data

[63] Continuation of Ser. No. 346,643, May 3, 1989, abandoned.

[30] Foreign Application Priority Data

May 10, 1988 [JP] Japan .............................. 63-111496
May 28, 1988 [JP] Japan .............................. 63-129480

[51] Int. Cl.$^5$ ............................................. B41J 11/44
[52] U.S. Cl. ...................................... 400/76; 400/121
[58] Field of Search ........................... 400/61, 76, 121; 340/727, 729, 730, 731, 735, 750, 751, 790; 364/519-523

[56] References Cited

U.S. PATENT DOCUMENTS

| | | | |
|---|---|---|---|
| 4,286,329 | 8/1981 | Goatzel | 340/790 |
| 4,316,188 | 2/1982 | Cancasci | 40/735 |
| 4,415,889 | 11/1983 | Davis | 340/727 |
| 4,511,267 | 4/1985 | Pokomy | 400/110 |
| 4,742,483 | 5/1988 | Morrell | 364/900 |
| 4,811,242 | 3/1989 | Adachi | 400/61 |
| 4,879,666 | 11/1989 | Nobumitsu | 364/519 |

FOREIGN PATENT DOCUMENTS

| | | | |
|---|---|---|---|
| 3633613 | 4/1987 | Fed. Rep. of Germany | 400/76 |
| 3716752 | 11/1987 | Fed. Rep. of Germany | 364/519 |
| 120786 | 6/1986 | Japan | 400/17 |
| 197252 | 9/1986 | Japan | 400/121 |
| 2182471 | 5/1987 | United Kingdom | 400/76 |

Primary Examiner—Edgar S. Burr
Assistant Examiner—Steven S. Kelley
Attorney, Agent, or Firm—Fitzpatrick, Cella, Harper & Scinto

[57] ABSTRACT

There is provided a printing apparatus having a font pattern memory to store portrait font patterns and a pattern converter to convert the portrait font pattern which is read out of the font pattern memory into the landscape font pattern, in which both of the portrait printing process and the landscape printing process are executed. This printing apparatus comprises: a frequency information memory such as a nonvolatile memory to store print frequency information of each of the portrait font patterns; a managing circuit to update and manage the print frequency information which is stored into the frequency information memory in parallel with the printing process; a landscape memory to store a predetermined number of landscape font patterns converted by the pattern converter on the basis of the print frequency information which is updated and managed by the managing circuit so that the landscape font patterns can be updated; and a landscape font pattern generation controller for comparing input print information with the print frequency information and for preferentially generating the landscape font pattern from the landscape memory. Thus, a desired landscape font pattern can be efficiently generated and printed at a low cost and the landscape printing process according to the latest print frequency information can be always executed.

8 Claims, 5 Drawing Sheets

| | |
|---|---|
| 244E ₕ | C31 |
| 4240 ₕ | C32 |
| 4F3A ₕ | C33 |
| 3256 ₕ | C34 |
| 3B52 ₕ | C35 |
| の | P31 |
| 太 | P32 |
| 郎 | P33 |
| 花 | P34 |
| 子 | P35 |

| | | |
|---|---|---|
| 0 | 0 | P2122 |
| 0 | 0 | P2123 |
| 0 | 0 | P2124 |
| ⋮ | | |
| 0 | 1 | P243F |
| ⋮ | | |
| 1 | 1 | P244E |
| ⋮ | | |
| 1 | 0 | P3256 |
| ⋮ | | |
| 0 | 0 | P3265 |
| ⋮ | | |
| 1 | 0 | P3B52 |
| ⋮ | | |
| 1 | 0 | P4240 |
| ⋮ | | |
| 0 | 0 | P4555 |
| ⋮ | | |
| 1 | 0 | P4F3A |
| ⋮ | | |

PRINTING APPARATUS

This application is a continuation of application Ser. No. 346,643 filed May 3, 1989, now abandoned.

BACKGROUND OF THE INVENTION

1. Field of the Invention

The present invention relates to a printing apparatus for analyzing input print information and printing a font pattern corresponding to a character code to a landscape or portrait.

2. Related Background Art

Hitherto, in such printing apparatus, there has been put into practical use an apparatus which can execute both of the portrait printing process in which the input document information is printed in the direction perpendicular to the longitudinal direction of a recording medium and the landscape printing process in which the input document information is printed in parallel with the longitudinal direction of the recording medium.

In one type of printing apparatus, the font pattern to be printed may be supplied from an external storage device such as a font cartridge or the like, where both a font pattern for the portrait print and a font pattern for the landscape print are previously stored. Either one of the font patterns is then supplied in accordance with the print control information, and the printing process is executed. In a second type, when the landscape printing process is executed, the font pattern for the portrait print is read out of the font cartridge and is transmitted through software of the printer or hardware, such as an expensive developing circuit or the like, thereby generating the landscape print font.

Therefore, in the former type, it is necessary to use a storage medium of a large capacity to store all of the font pattern for the portrait print and the font pattern for the landscape print. Although a desired font pattern can be generated at a high speed, there is a problem such that the cost of the font cartridge is remarkably high.

On the other hand, according to the latter type, it is sufficient that only the font pattern for the portrait print is stored in the font cartridge. Therefore, although the cost of the font cartridge can be reduced, there are problems such that it takes a long time for the software processes to convert the font pattern for the portrait print into the font pattern for the landscape print. The print processing efficiency is deteriorated, and the total throughput in the printer is largely reduced, and the like.

SUMMARY OF THE INVENTION

It is the first object of the present invention to provide a printing apparatus in which the landscape pattern generating process of a font pattern having a high print frequency can be omitted, a desired landscape font pattern can be generated, and the landscape printing process can be efficiently executed by the low cost.

The second object of the invention is to provide a printing apparatus in which print frequency information is always updated and managed at a predetermined timing and the landscape printing process corresponding to the latest print frequency information can be executed.

The third object of the invention is to provide a printing apparatus in which a print frequency information memory is a nonvolatile memory medium, the landscape printing process according to the past print frequency information carrier can be restarted from the turn-on of the power supply, and the landscape printing process according to the optimum print frequency information can be always executed.

DETAILED DESCRIPTION OF THE PREFERRED EMBODIMENTS

Figure 1:
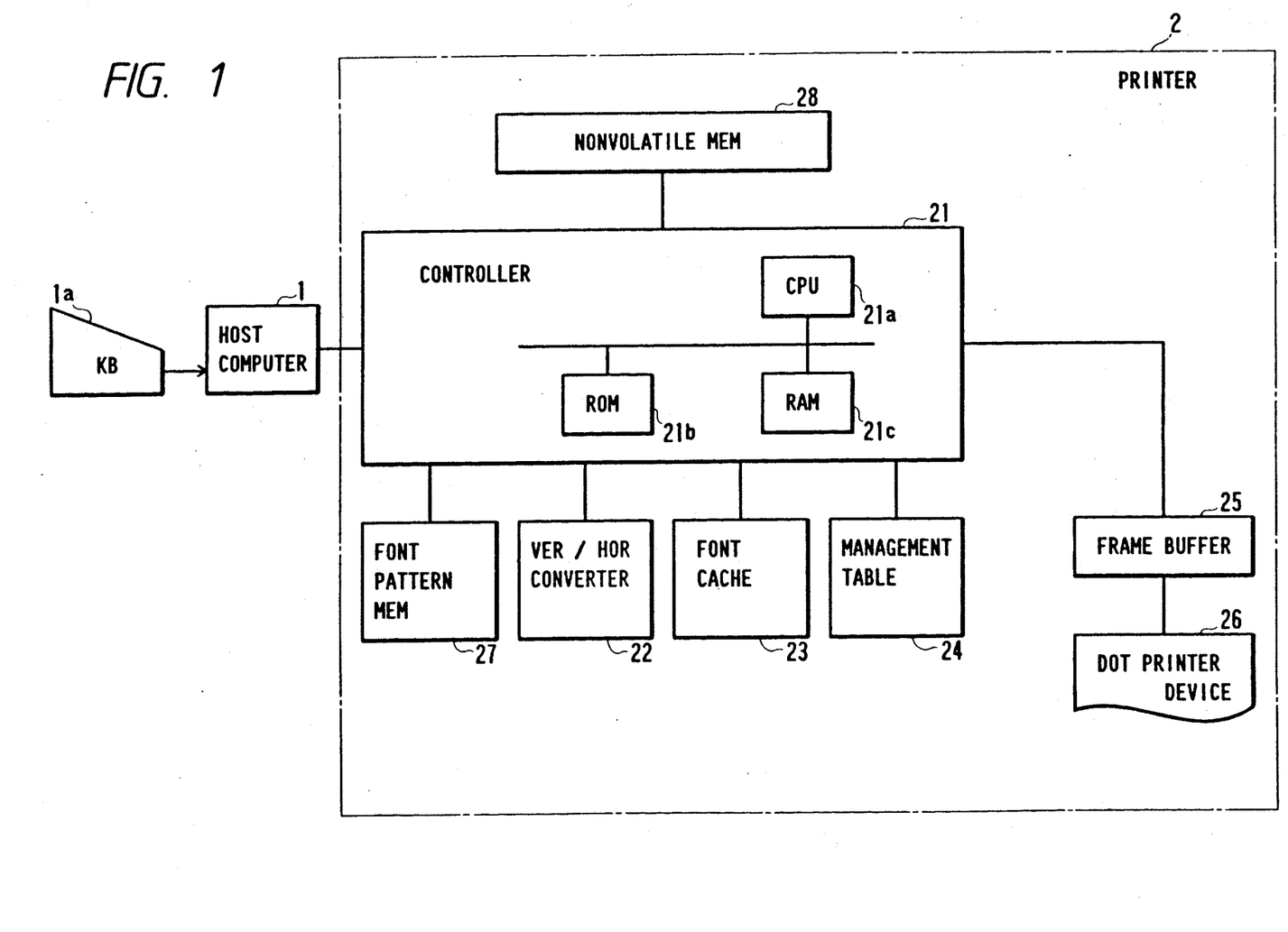
FIG. 1 is a block diagram for explaining an example of a printing apparatus showing an embodiment of the present invention.

FIG. 1 is a block diagram for explaining an example of a printing apparatus showing an embodiment of the present invention. Reference numeral 1 denotes a host computer for outputting a character code and print control information (including landscape print designation information, portrait print designation information, and the like) serving as print information which are input from a keyboard 1a or the like to a printer 2 as printing means.

The printer 2 comprises: a controller 21; a vertical/horizontal converter 22; a font cache 23; a management table 24; a frame buffer 25; a dot printer device 26; a font pattern memory 27; a nonvolatile memory 28; and the like. The controller 21 comprises: a CPU 21a; an ROM 21b; an RAM 21c; and the like. The CPU 21a executes a print information processes on the basis of a control program (control procedure including a flowchart, which will be explained hereinafter) stored in the ROM 21b.

The vertical/horizontal converter 22 converts the vertical/horizontal direction of the portrait font pattern corresponding to the character code input from the host computer 1 or the character code in the print frequency information stored in the nonvolatile memory 28, thereby generating the landscape font pattern. The font cache 23 constructs the landscape memory in the invention and stores the landscape font pattern converted by the vertical/horizontal converter 22 on the basis of the print frequency information which is updated and managed by the CPU 21a as the managing means such that a predetermined number of landscape font patterns can be updated. The CPU 21a updates and manages the print frequency information which is stored into the nonvolatile memory 28 in parallel with the printing process. When the power supply is turned on, the print frequency information is once filed into the management table 24. After that, during the execution of the printing process, the CPU 21a updates and manages the management table 24. Every execution of the printing process, for instance, each time the printing process of predetermined pages has been finished or each time a predetermined time has elapsed, the CPU 21a stores the content of the management table 24 into the nonvolatile memory 28.

The frame buffer 25 stores dot patterns which are output from the controller 21 by an amount of, for instance, one page. Synchronously with the dot printer 26, the dot patterns of the portrait or landscape which were developed are transferred to the dot printer 26 and printed. The font patterns of the portrait are stored in the font pattern memory 27 as the font pattern memory means in the invention in correspondence to the character codes in a one-to-one corresponding manner. The nonvolatile memory 28 is the frequency information memory in the invention and stores the print frequency information (which will be explained hereinlater) of each portrait font pattern so that it can be updated by the managing means, which will be explained hereinlater. On the other hand, the controller 21 also functions as the landscape font pattern generating control means in the invention and compares the input print information and the print frequency information and allows the corresponding landscape font pattern to be preferentially generated from the font cache 23.

Figure 2:
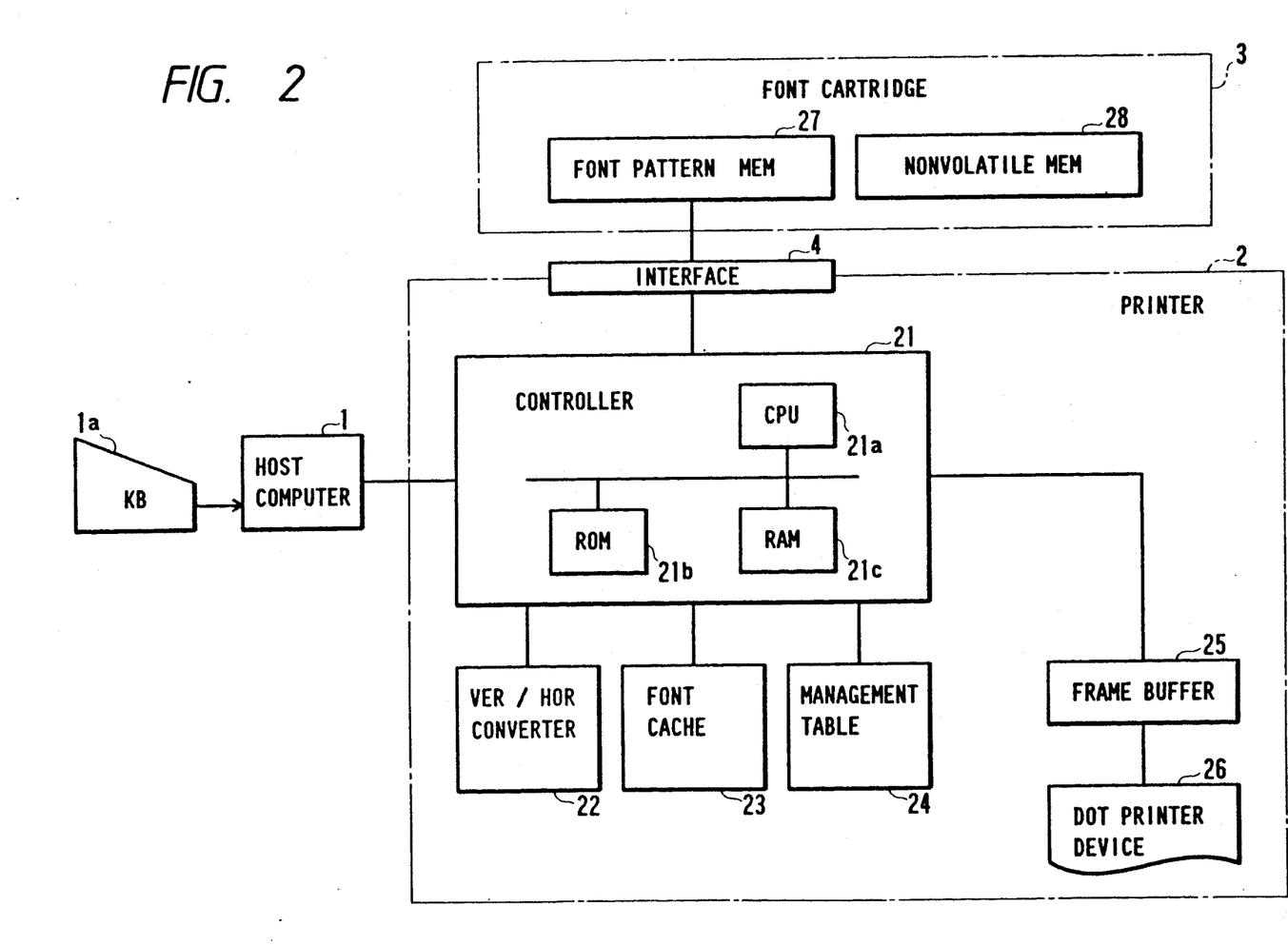
FIG. 2 is a block diagram of another embodiment.

FIG. 2 is a block diagram showing a construction of another embodiment of the invention. In this embodiment, the font pattern memory 27 and nonvolatile memory 28 shown in FIG. 1 are included in a font cartridge 3 as the external memory means. The font cartridge 3 is connected to the printer 2 through an interface 4. The font cartridge 3 is obviously detachable.

Figure 3:
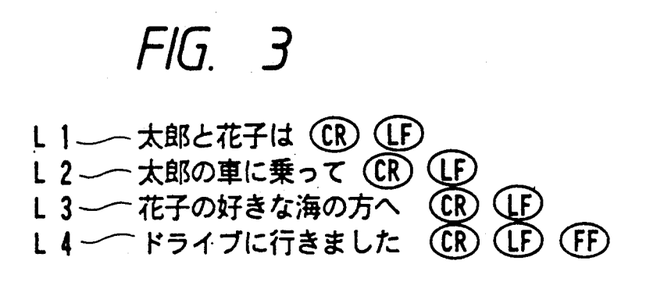
FIG. 3 is a diagram for explaining an example of print data which is input from a host computer shown in FIG. 1.

FIG. 3 is a diagram for explaining an example of the print data input from the host computer 1 shown in FIG. 1. $L_1$ to $L_4$ denote print data. A carriage return code CR and a line feed code LF as print control commands are added to each of the print data $L_1$ to $L_4$. Particularly, a form feed code FF is added to the print data $L_4$.

Figure 4:
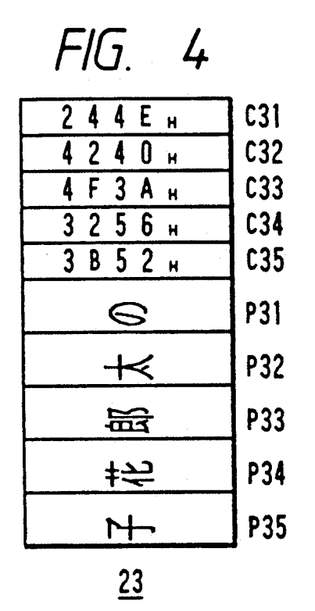
FIG. 4 is a schematic diagram for explaining a construction of a font cache shown in FIG. 1.

FIG. 4 is a schematic diagram for explaining a construction of the font cache 23 shown in FIG. 1. $C_{31}$ to $C_{35}$ denote code areas. A character code "244E$_H$" corresponding to the landscape font pattern of a character " " ("no") which is stored into a font area $P_{31}$ is stored into the code areas $C_{31}$. A character code "4240$_H$" corresponding to the landscape font pattern of a character " " ("ta") which is stored into a font area font area $P_{32}$ is stored into the code area $C_{32}$.

A character code "4F3A$_H$" corresponding to the landscape font pattern of a character " " ("rou") which is stored into a font area $P_{33}$ is stored into the code area $C_{33}$.

A character code "3256$_H$" corresponding to the landscape font pattern of a character " " ("hana") which is stored into a font area $P_{34}$ is stored into the code area $C_{34}$.

A character code "3B52$_H$" corresponding to the landscape font pattern of a character " " ("ko") which is stored into a font area $P_{35}$ is stored into the code area $C_{35}$.

Figure 5:
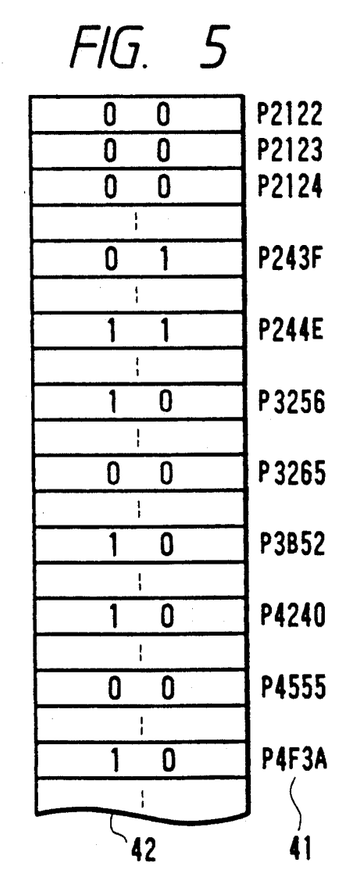
FIG. 5 is a schematic diagram for explaining a data structure in a management table and a nonvolatile memory shown in FIG. 1.

FIG. 5 is a schematic diagram for explaining a data structure in the management table 24 and the nonvolatile memory 28 shown in FIG. 1. Reference numeral 41 denotes a character code corresponding to each of the portrait font pattern which are stored into the font pattern memory 27. Print frequency information 42 corresponding to the character codes 41 in a one-to-one corresponding manner is stored and managed by, for instance, two bits. Such a storage management state is shown in FIG. 5. Particularly, the portrait font pattern in which the character code 41 is "P244E" corresponding to the character " " ("no") and the print frequency is set to 3, that is, "11" as a binary number.

As will be understood from the diagram, when the print data $L_1$ to $L_4$ shown in FIG. 3 are processed, the print frequency information 42 corresponding to the character codes 41 are sequentially updated. The print frequency information 42 in the areas corresponding to the character codes 41 which are not used to print are set to "00". Particularly, since three characters of " " ("no") exist in each of the print data $L_1$ to $L_4$, the print frequency information 42 is set to "11".

The landscape font pattern print processing operation according to the invention will now be described in detail with reference to FIGS. 6 to 8.

Figure 6:
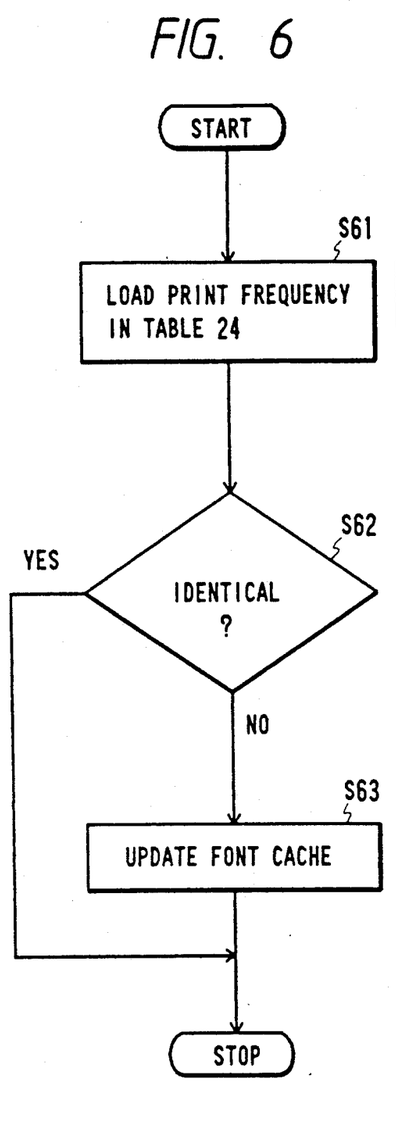
FIG. 6 is a flowchart for explaining an example of a procedure for the print frequency information loading process according to the invention.

FIG. 6 is a flowchart for explaining an example of a procedure for the print frequency information loading process according to the invention. This process is executed when the power supply is turned on or when the dot print 26 is in the idle state.

First, the CPU 21a accesses the nonvolatile memory 28 and loads the print frequency information 42 corresponding to each portrait font pattern into the management table 24 (step S61).

Next, the print frequency information 42 of the characters in the management table 24 are checked. The character codes 41 of the upper five characters having high frequency orders are selected and compared with five characters registered in the font cache 23, thereby discriminating whether their contents coincide or not (step S62). If YES, the processing routine is finished. If NO, the portrait font pattern corresponding to the character code 41 which does not coincide is read out of the font pattern memory 27, the landscape pattern corresponding to the dissident character code 41 is generated by using the vertical/horizontal converter 22 and is registered together with the character code 41 into the font cache 23, and in this manner, the updating process is executed (S63). Then, the processing routine is finished.

Particularly, since the font cache 23 is all set into "NULL" when the power supply is turned on, the landscape patterns of all of the upper five characters are stored.

Figure 7:
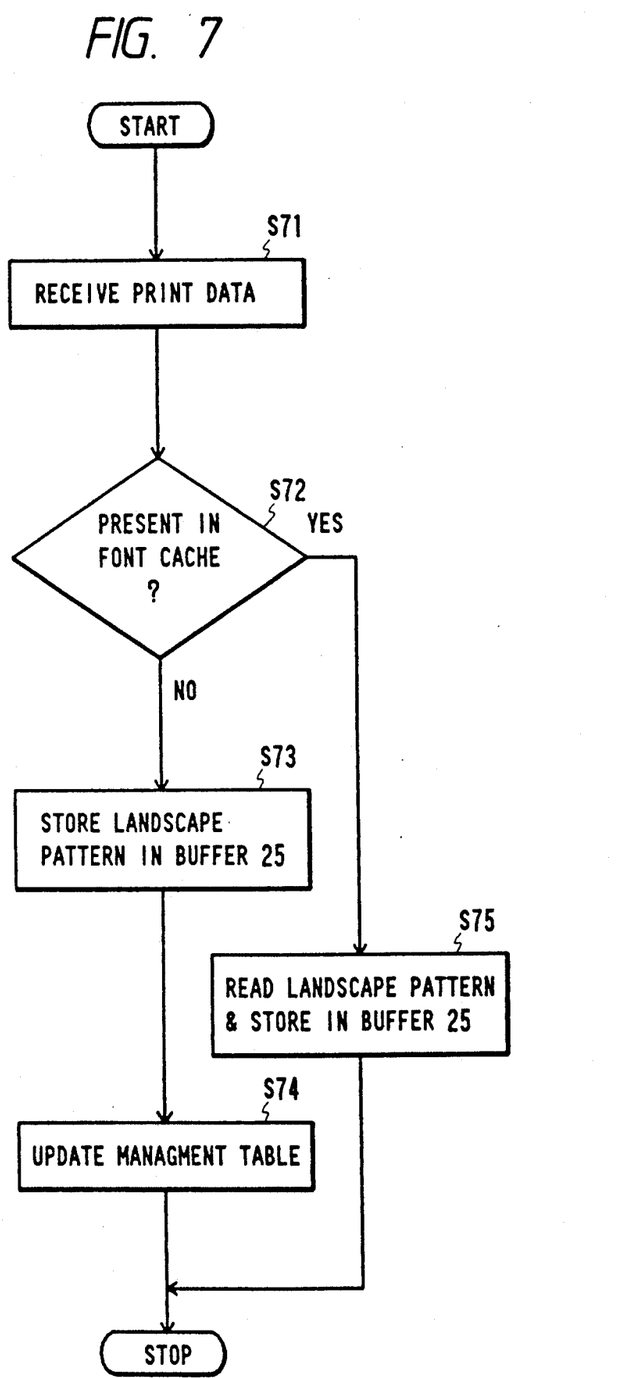
FIG. 7 is a flowchart for explaining an example of a procedure for the landscape printing process according to the invention.

FIG. 7 is a flowchart for explaining an example of a procedure for the landscape printing process according to the invention.

First, the CPU 21a receives print data from the host computer 1 (S71) and check to see if the received character code 41 exists in the code areas $C_{31}$ to $C_{35}$ in the font cache 23 or not (S72). If NO, the portrait font pattern corresponding to the received character code 41 is read out of the font pattern memory 27 and the landscape font pattern is generated by the vertical/horizontal converter 22 and is developed into the frame buffer 25 (S73). Next, the print frequency information 42 in the management table 24 is updated (S74). Then, the processing routine is finished.

On the other hand, if YES in the discriminating step S72, the converted landscape font pattern is read out of the font cache 23 and is developed into the frame buffer 25 (S75). Then, the processing routine is finished.

Figure 8:
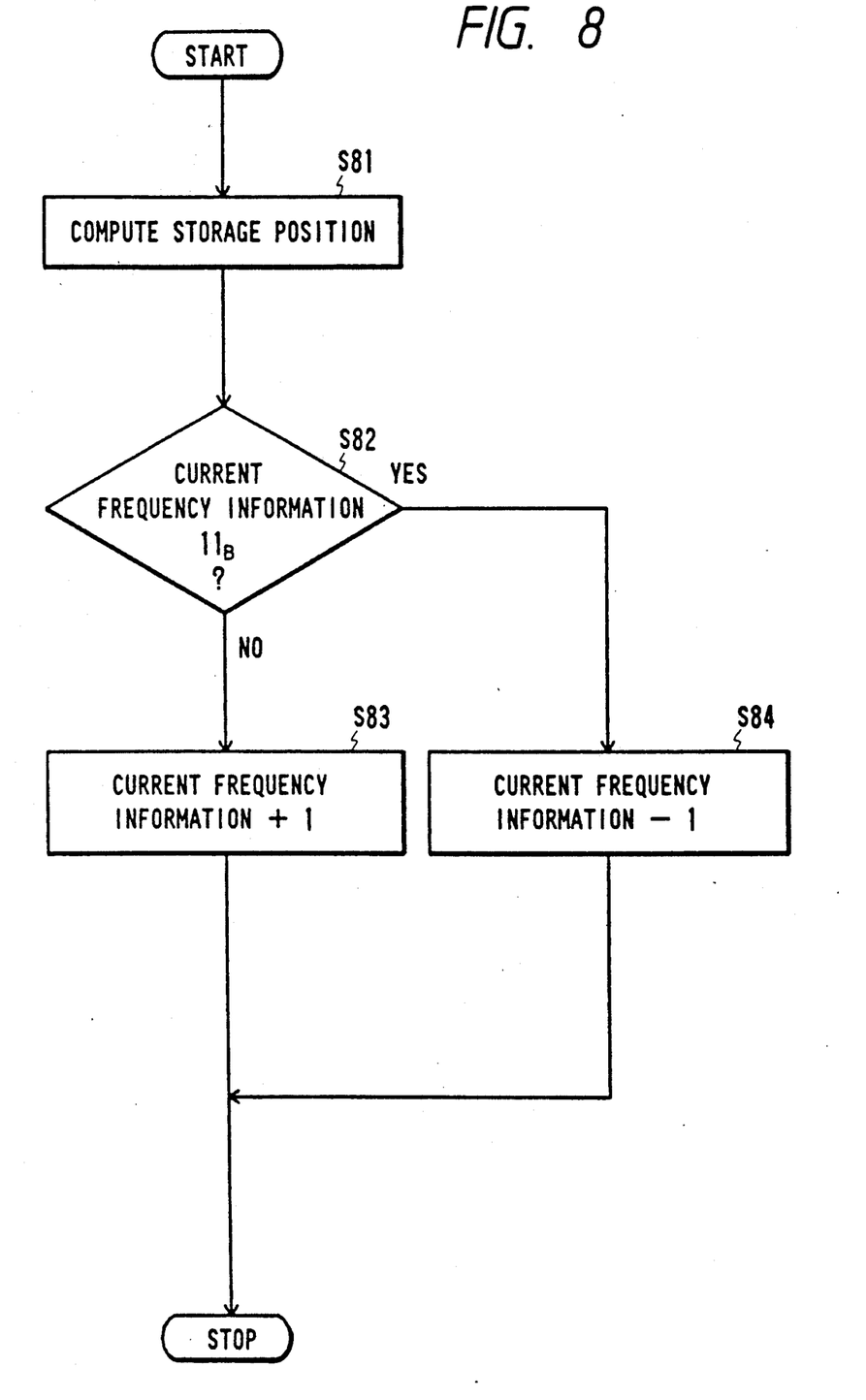
FIG. 8 is a flowchart showing an example of a procedure for the print frequency information updating process according to the invention.

FIG. 8 is a flowchart showing an example of a procedure for the print frequency information updating process according to the invention.

First, the CPU 21a calculates the storage position in the management table 24 corresponding to the received character code 41 (S81). Next, a check is made to see if the print frequency information 42 corresponding to the calculated character code 41 is "$11_B$" or not (S82). If NO, "1" is added to the current print frequency information 42 (S83). Then, the processing routine is finished.

On the other hand, if YES in the discriminating step S82, the print frequency information 42 corresponding to the relevant character code 41 is unchanged but "1" is subtracted from the print frequency information 42 corresponding to the other character code (S84). Then, the processing routine is finished. If the other print frequency information 42 is "$00_B$", such a subtraction is not executed.

Although the timing to store the content of the management table 24 into the nonvolatile memory 28 is not particularly mentioned, if it is stored each time a predetermined time has elapsed or each time the printing operation of the characters of a predetermined number of pages has been finished, the landscape font printing process according to the latest print frequency information 42 can be always efficiently executed.

The embodiment has been described with respect to the case of processing the font pattern in accordance with the print frequency information 42 by a method such that the portrait font pattern is converted into the landscape font pattern (vertical/horizontal conversion). However, it is also possible to apply the invention to not only the vertical/horizontal conversion but also the magnification/reduction conversion and to execute the magnification font pattern developing process according to the print frequency information 42 at a high speed.

Although an embodiment has been described with respect to an example of the printing apparatus for printing Japanese as a language, the invention can be also applied to a Chinese printer which supports a number of character sets other than Japanese.

What is claimed is:

1. A printing apparatus having a font pattern memory to store portrait font patterns and pattern converting means for converting the portrait font pattern which is read out of said font pattern memory into a landscape font pattern, in which both a portrait printing process and a landscape printing process are executed, said printing apparatus comprising:
    a frequency information memory to store print frequency information of each of the portrait font patterns;
    managing means for updating and managing the print frequency information to be stored into said frequency information memory in parallel with a printing process;
    a landscape memory for storing a predetermined number of landscape font patterns which are converted by said pattern converting means on the basis of the print frequency information which is updated and managed by said managing means in a manner such that said landscape font patterns can be updated; and
    landscape font pattern generation control means for determining whether a landscape font pattern corresponding to input print information is stored in said landscape memory,
    said landscape font pattern generation control means directing the output of the corresponding landscape font pattern when a corresponding landscape font pattern is stored in said landscape memory, and
    said landscape font pattern generation control means reading one of the portrait font patterns stored in said font pattern memory corresponding to the input print information, directing said pattern converting means to convert the read one portrait font pattern to a landscape font pattern, directing the output of the converted landscape font pattern, and directing said landscape memory to store the converted landscape font pattern when a corresponding landscape font pattern is not stored in said landscape memory.

2. An apparatus according to claim 1, wherein said frequency information memory is a nonvolatile memory.

3. An apparatus according to claim 1, further having indicating means for indicating a portrait print output or a landscape print output, and wherein the portrait font pattern or landscape font pattern is printed and output in accordance with the indication of said indicating means.

4. A printing apparatus according to claim 1, wherein said font pattern memory comprises a memory which may be detachably mounted to said printing apparatus.

5. A printing apparatus having interface means for transferring a portrait font pattern which is supplied from external memory means and pattern converting means for converting the portrait font pattern received through said interface means into a landscape font pattern, in which both of a portrait printing process and a landscape printing process are executed, said printing apparatus comprising:
    a frequency information memory, provided in said external memory means, for storing print frequency information of each of the portrait font patterns;
    managing means for updating and managing the print frequency information to be stored into said frequency information memory in parallel with the printing process;
    a landscape memory for storing a predetermined number of landscape font patterns converted by said pattern converting means on the basis of the print frequency information which is updated and managed by said managing means in a manner such that said landscape font patterns can be updated; and
    landscape font pattern generation control means for determining whether a landscape font pattern corresponding to input print information is stored in said landscape memory,
    said landscape font pattern generation control means directing the output of the corresponding landscape font pattern when a corresponding landscape font pattern is stored in said landscape memory, and
    said landscape font pattern generation control means reading one of the portrait font patterns received through said interface means corresponding to the input print information, directing said pattern converting means to convert the read one portrait font pattern to a landscape font pattern, directing the output of the converted landscape font pattern, and directing said landscape memory to store the converted landscape font pattern when a corresponding landscape font pattern is not stored in said landscape memory.

6. An apparatus according to claim 5, wherein said frequency information memory is a nonvolatile memory medium.

7. An apparatus according to claim 5, further having indicating means for indicating a portrait print output or a landscape print output, and wherein the portrait font pattern or landscape font pattern is printed and output in accordance with the indication of said indicating means.

8. A printing apparatus according to claim 5, wherein said external memory means comprises a memory which may be detachably mounted to said printing apparatus.

* * * * *

UNITED STATES PATENT AND TRADEMARK OFFICE
CERTIFICATE OF CORRECTION

PATENT NO. : 5,044,790
DATED : September 3, 1991
INVENTOR(S) : Yoshiaki Kawamura It is certified that error appears in the above-identified patent and that said Letters Patent is hereby corrected as shown below:

Title Page:

[56] REFERENCES CITED:

Change "Goatzel" to --Goertzel--.
    Change "Pokomy" to --Pokorny--.

COLUMN 2

Line 47, change "processes" to --process--.

COLUMN 3

Line 19, change "hereinlater" to --hereinafter--.

Line 22, change "later" to --after--.

Line 47, change "areas $C_{31}$." to --area $C_{31}$.--.

COLUMN 4

Line 24, change "dot print 26" to --dot printer 26--.

Line 54, change "check" to --checks--.

Signed and Sealed this

Twenty-fifth Day of May, 1993

Attest:

MICHAEL K. KIRK

Attesting Officer      Acting Commissioner of Patents and Trademarks